United States Patent [19]

Okada

[11] Patent Number: 5,381,397
[45] Date of Patent: Jan. 10, 1995

[54] DATA RECORDING MEDIUM, METHOD OF RECORDING DATA THEREON, AND APPARATUS FOR AND METHOD OF REPRODUCING IT

[75] Inventor: Shinichi Okada, Tokorozawa, Japan

[73] Assignee: Pioneer Electronic Corporation, Tokyo, Japan

[21] Appl. No.: 52,270

[22] Filed: Apr. 22, 1993

[30] Foreign Application Priority Data

Apr. 24, 1992 [JP] Japan .................. 4-107094

[51] Int. Cl.$^6$ .............................................. G11B 7/00
[52] U.S. Cl. .................................. 369/124; 369/48
[58] Field of Search .................. 369/124, 125, 112, 48, 369/54, 59, 275.3

[56] References Cited

U.S. PATENT DOCUMENTS 4,495,531  1/1985  Sasamura ........................... 360/65
4,525,822  6/1985  Nishimura ......................... 369/124
4,591,927  5/1986  Owaki et al. ...................... 360/15

*Primary Examiner*—Paul M. Dzierzynski
*Assistant Examiner*—Kiet T. Nguyen
*Attorney, Agent, or Firm*—Kane, Dalsimer, Sullivan, Kurucz, Levy, Eisele and Richard

[57] ABSTRACT

An apparatus for reproducing data from a recording medium on which data including phase adjustment pattern data are recorded, the phase adjustment pattern data including a plurality of solitary waves, the apparatus including: unit for reproducing the recorded data from the recording medium in synchronism with a read clock and producing a reproduced signal; unit for extracting the phase adjustment pattern data from the reproduced signal and producing the solitary wave signal; unit for detecting a phase shift between the reproduced signal and the read clock on the basis of the solitary wave signal; and unit for adjusting phases of the read clock and the reproduced signal to be in phase with each other on the basis of detected phase shift.

11 Claims, 10 Drawing Sheets

DATA RECORDING MEDIUM, METHOD OF RECORDING DATA THEREON, AND APPARATUS FOR AND METHOD OF REPRODUCING IT

BACKGROUND OF THE INVENTION

1. Field of the Invention

This invention relates to a data recording medium such as a write once type optical disk, a method of recording data onto the recording medium, and an apparatus for and method of reproducing the recorded data therefrom.

2. Description of the Prior Art

As a write once type optical disk, WORM (Write Once Read Many) type optical disk is known. In the case of recording data onto such a write once type optical disk and reproducing the recorded data therefrom, accurate tracking control must be carried out similarly to the case of other types of optical disks.

As a tracking servo system of a write once type optical disk, there are a Continuous Servo system (hereinafter referred to as "CS system") known as a continuous groove system, and a Sampled Servo system (hereinafter referred to as "SS system").

A recording/reproducing apparatus for a write once type optical disk is shown in FIG. 1. As shown in FIG. 1, the write once type optical disk 1 is rotated by a spindle motor 2. At the time of recording data, recording data $D_{REC}$ is optically recorded onto the optical disk 1 by means of a recording circuit 4 at timings of a write clock signal $CLK_W$ supplied from a write clock generator 3. Thus, recording pits each corresponding to the recording data $D_{REC}$ are formed on the optical disk 1. At the time of reproducing the recorded data, a reproducing signal $X_1$ is reproduced from the recording surface of the optical disk 1 by means of an optical pickup (not shown) while the optical disk 1 being rotated. A data reproducing circuit 5 executes certain processing such as amplification or waveform shaping onto the reproducing signal $X_1$, and the signal thus obtained is fed to an A/D converter 6 as reproduced data $X_2$. An A/D converter 6 converts the reproduced data $X_2$ into a digital data $D_{OUT}$ at timings of a read clock signal $CLK_R$ generated by a reproducing clock generator (not shown). The digital data $D_{OUT}$ is fed to a controller (MPU) (not shown).

In the above-mentioned recording/reproducing apparatus, in order to correctly reproduce the recorded data, it is necessary that the read clock signal $CLK_R$ has a correct phase relationship with respect to the reproducing signal. This is particularly important when the recording density of the write once type optical disk is increased and the transfer rate of data becomes high. Namely, if the data transfer rate is increased, a frequency of the read clock signal $CLK_R$ becomes high, and accordingly the window width for data detection becomes narrow. As a result, when any phase shift takes place between the reproduced data $X_2$ recorded at the timings of the write clock signal $CLK_W$ and the read clock signal $CLK_R$ for reading out the reproduced data $X_2$, the probability of erroneous data reproduction becomes high and the phase margin becomes small.

In this regard, in an apparatus for reproducing an optical disk according to a format of the CS system, the read clock signal $CLK_R$ is generated from reproduced data, so that a phase shift of the read clock signal $CLK_R$ becomes relatively small. However, when the recording density is increased, a phase shift may inevitably take place because of unevenness (variations) of the recording characteristics of respective optical disks, or unevenness (variations) of the delay characteristic of the reproducing system, etc.

On the other hand, in an apparatus for reproducing an optical disk according to a format of the SS system, the read clock signal $CLK_R$ is generated from prepits formed in advance on the optical disk. However, even in this case, phase shift may take place between the reproduced data $X_2$ and the read clock signal $CLK_R$ because of unevenness (variations) of the recording characteristics of respective optical disks, unevenness (variations) of respective delay characteristics of the prepit reproducing system and the data reproducing system.

For correcting such a phase shift, one method predicts a phase shift which would take place in the reproduction at the time of recording and controls the timing for writing recording data $D_{REC}$ so as to correct the phase shift to be a minimum level at the time of reproduction.

However, according to such a technique for correcting the phase shift, any phase shift may take place by the influence of unevenness (variations) of the recording characteristics of optical disks or unevenness (variations) in the characteristics of respective reproducing apparatuses when disks having different recording characteristics are reproduced by the same reproducing apparatus or the same disk is reproduced by different reproducing apparatuses.

SUMMARY OF THE INVENTION

It is an object of the present invention to provide data recording and reproducing system which detects and corrects the phase shift so that accurate reproduction of the recorded data is performed.

According to one aspect of the present invention, there is provided a method of recording data onto a recording medium including the steps of: recording data to be recorded onto a recording medium, and recording phase adjustment pattern data including a plurality of solitary waves together with the data to be recorded.

According to another aspect of the present invention, there is provided a data recording disk having data recording tracks spirally formed, including: a plurality of first recording blocks formed on the recording tracks for recording data to be recorded; and a plurality of second recording blocks for recording phase adjustment pattern data including a plurality of solitary waves, each of the second recording blocks being provided in each of the first recording blocks, and the phase adjustment pattern data is recorded intermittently between the data to be recorded in the first recording blocks.

In accordance with the above feature of the present invention, phase adjustment pattern data including a plurality of solitary waves are recorded together with data to be recorded, so that a phase of a read clock signal is adjusted on the basis of the phase adjustment pattern data at the time of reproduction. Thus, reproducing ability of data can be improved.

According to still another aspect of the present invention, there is provided a method of reproducing data from a recording medium on which data including phase adjustment pattern data are recorded, the phase adjustment pattern data including a plurality of solitary waves, the method including the steps of: reproducing the recorded data from the recording medium in synchronism with a read clock and producing a reproduced signal; extracting the phase adjustment pattern data from the reproduced signal and producing the solitary waves; detecting a phase shift between the reproduced signal and the read clock signal; and adjusting phases of the read clock and the reproduced signal to be in phase with each other on the basis of detected phase shift.

According to still another aspect of the present invention, there is provided an apparatus for reproducing data from a recording medium on which data including phase adjustment pattern data are recorded, the phase adjustment pattern data including a plurality of solitary waves, the apparatus including: unit for reproducing the recorded data from the recording medium in synchronism with a read clock and producing a reproduced signal; unit for extracting the phase adjustment pattern data from the reproduced signal and producing the solitary wave signal; unit for detecting a phase shift between the reproduced signal and the read clock on the basis of the solitary wave signal; and unit for adjusting phases of the read clock and the reproduced signal to be in phase with each other on the basis of detected phase shift.

In accordance with the above feature of the present invention, even when there is used a reproducing system having a read clock signal of a phase different from that of a write clock signal at the time of recording, phase adjustment can be accurately conducted.

DESCRIPTION OF THE PREFERRED EMBODIMENTS

Preferred embodiments of the present invention will now be described with reference to the attached drawings.

[I] Fundamental Principle

Figure 1:
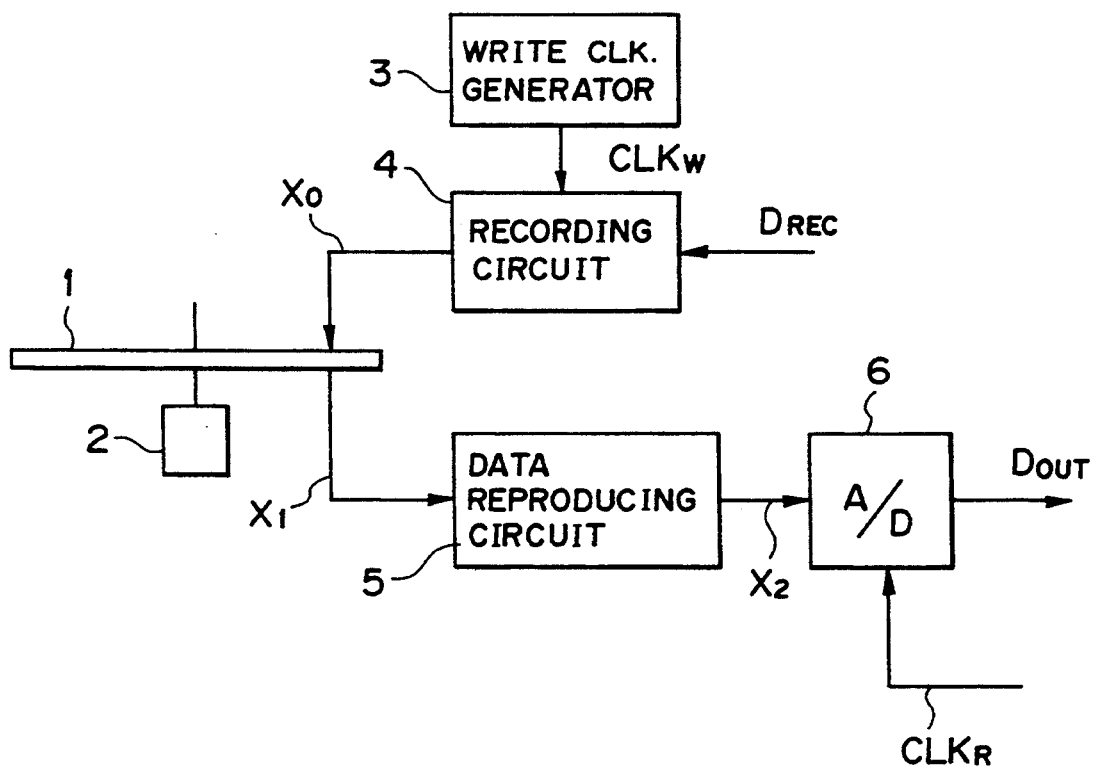
FIG. 1 is a block diagram showing the outline of a recording/reproducing apparatus of a write once type optical disk.
Figure 2:
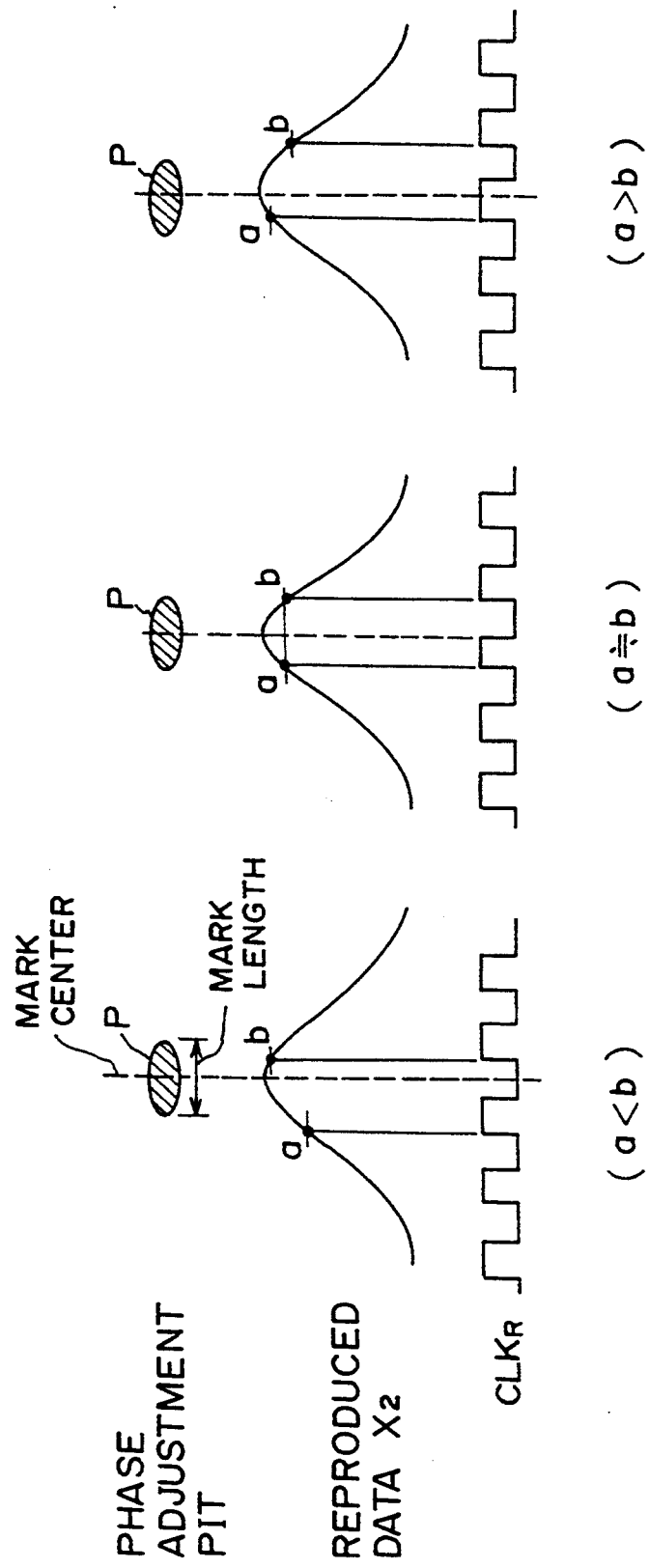
FIGS. 2A-2C are explanatory views showing the fundamental principle of this invention.

The fundamental principle of this invention will be described below with reference to FIG. 2. When recording data is recorded on an optical disk as a pit P having a predetermined mark length as shown in FIGS. 2A-2C, the reproduced data $X_2$ becomes a solitary wave substantially bilaterally symmetric in a track direction with respect to the mark center. If this reproduced data is sampled by various read clock signals $CLK_R$ having different phases, phase relationships between the pit P and the clock signal $CLK_R$ are classified into following three patterns as shown in FIGS. 2A-2C.

The first pattern shown in FIG. 2A indicates that the read clock signal $CLK_R$ leads the reproduced data $X_2$ in phase. In this case, the relationship between sample values "a" and "b" is expressed as follows:

$$a < b$$

The second pattern shown in FIG. 2B indicates that the phase of the read clock signal $CLK_R$ is substantially in phase with the phase of reproduced data $X_2$. At this time, the sample values "a" and "b" have the relationship expressed below:

$$a = b$$

The third pattern shown in FIG. 2C indicates that the read clock signal $CLK_R$ lags the reproduced data $X_2$ in phase. At this time, the sample values "a" and "b" have the relationship expressed below:

$$a > b$$

By utilizing these relationships, it is possible to detect a phase shift between the reproduced data $X_2$ and the read clock signal $CLK_R$, i.e., a quantity of phase shift and a phase-shifting direction, in accordance with the relationship of magnitudes between sample values "a" and "b" of the reproduced data $X_2$. Further, the phase of the read clock signal $CLK_R$ or the phase of reproduced data $X_2$ can be adjusted, on the basis of a detected phase shift, so as to cancel the phase shift. In this manner, the phase shift can be corrected.

[II] Recording Operation

Figure 3:
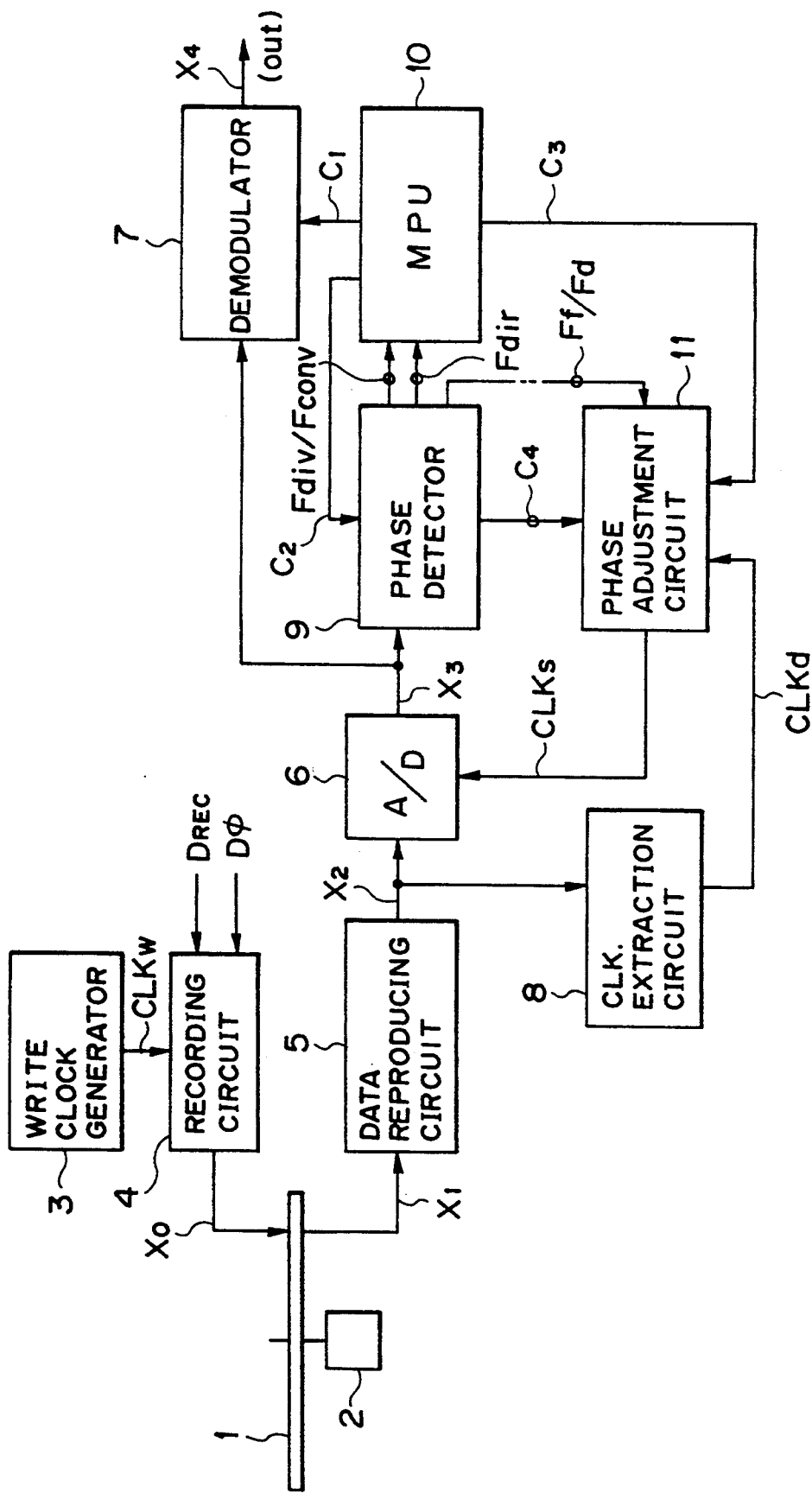
FIG. 3 is a block diagram showing the construction of a recording/reproducing apparatus of an optical disk according to the present invention.

An outline of an apparatus for recording data onto an optical disk and reproducing it therefrom is shown in FIG. 3.

A recording circuit 4 records recording data $D_{REC}$ onto an optical disk 1 at timings of a write clock signal $CLK_W$ supplied from a write clock generator 3. A recording signal $X_0$ includes phase adjustment pattern data $D\phi$ in addition to recording data $D_{REC}$ such as musical data, character data or still picture data.

The phase adjustment pattern data $D\phi$ is reference data used for adjusting the phase relationship between reproduced data $X_2$ and a read clock signal $CLK_S$ at the time of reproduction. Actually, the phase adjustment pattern data $D\phi$ is optically recorded onto the optical disk 1 as trains of plural phase adjustment pits P arranged in a track direction as shown in FIG. 4A.

Figure 4:
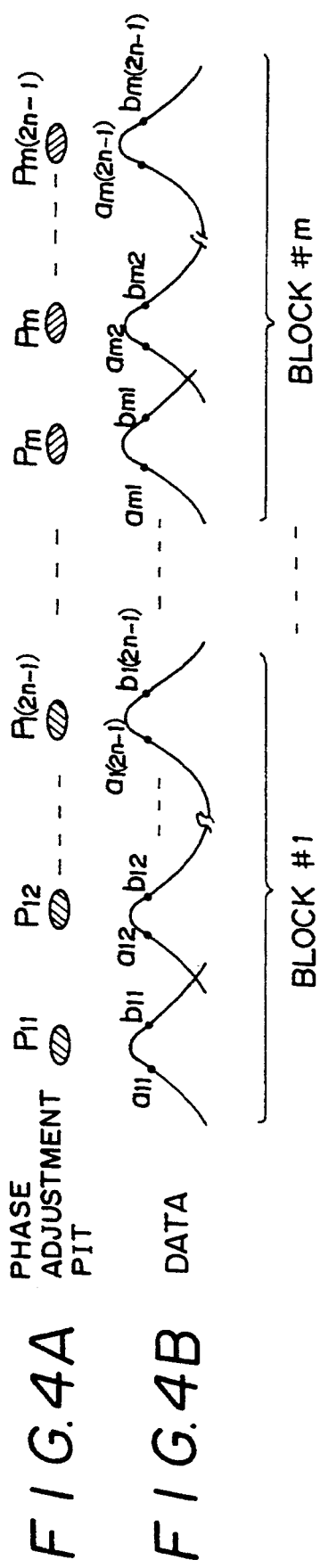
FIGS. 4A and 4B are explanatory views showing a recording manner of phase adjustment pits.

The phase adjustment pits P are formed in such a manner that pit intervals thereof are long enough so that the reproduced waves of the phase adjustment pits P become solitary waves and accordingly the sample points (points of $a_{11}$, $b_{11}$, $a_{12}$, $b_{12}$) in the reproduced data $X_2$ do not interfere with each other. This interval is determined in accordance with the write clock signal $CLK_W$. In FIG. 4, the phase adjustment pattern data $D\phi$ includes a plurality of blocks #1~#m. Further, each of blocks #1~#m has a plurality of pits $P_{11}$~$P_{1(2n-1)}$, $P_{m1}$~$P_{m(2n-1)}$. It is to be noted that the numbers of pits P in respective blocks #1~#m are the same in this embodiment, but this invention is not limited to such a feature.

The number of pits P of the phase adjustment pattern data Dφ is expressed as a whole as follows:

$$(2n-1) \times m \quad [1]$$

where n=1, 2, 3, ..., m=2, 3, 4, ...

In FIG. 4A, a plurality of phase adjustment pits P (2n−1) of the phase adjustment pattern data Dφ is formed and a plurality of blocks (m) each having a plurality of phase adjustment pits $P_{ij}$ are repeatedly provided. If only one phase adjustment pit P is formed, there is the possibility that the phase adjustment pits P is erroneously read or detected, especially when data is recorded on the disk at high recording density. Therefore, the reliability in reading the data is improved by increasing the number of phase adjustment pits P to be sampled, and the reliability is further improved by repeatedly providing a plurality of blocks #1~#m. In addition, the number of phase adjustment pits $P_{ij}$ within one block is set to an odd number (2n−1). This is because majority operation is performed when the magnitudes of sample values "a" and "b" are compared and phase judgment is executed on the basis of the compared result (which will be described in detail later).

Figure 5:
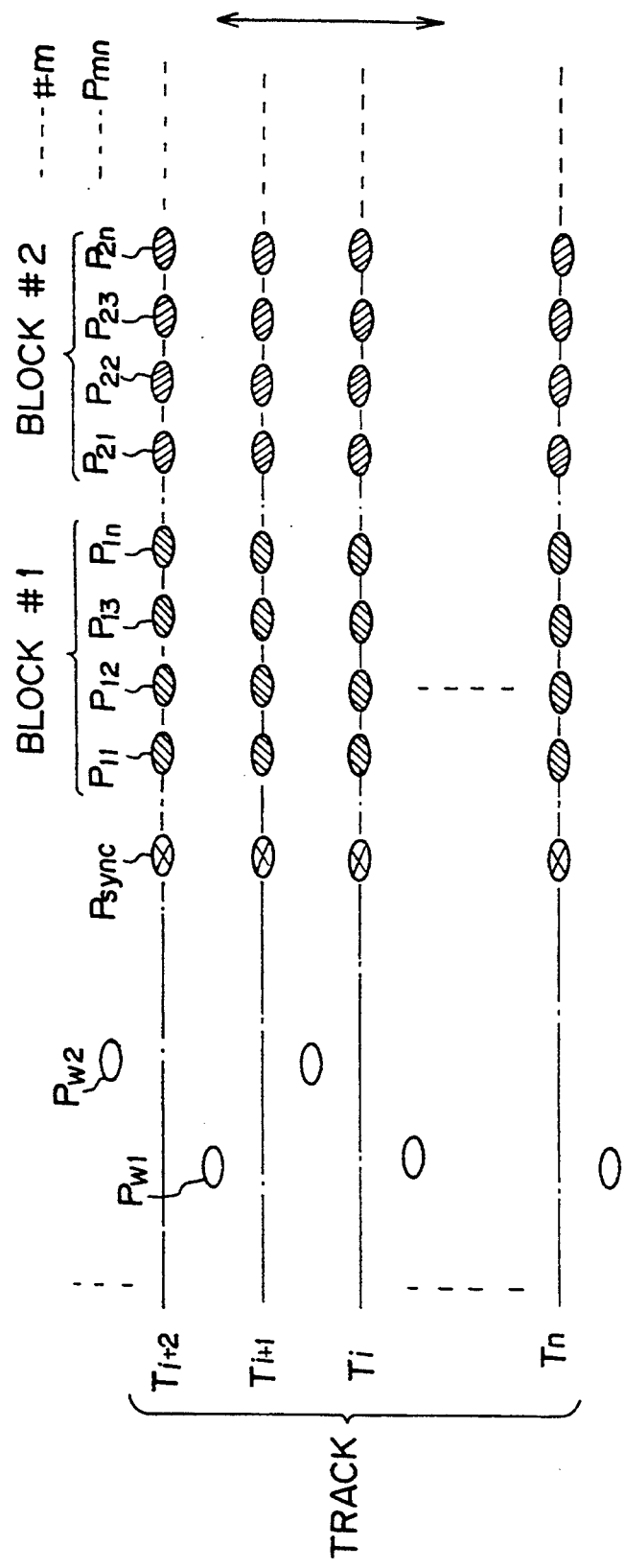
FIG. 5 is an explanatory view showing an arrangement of a phase adjustment pits.

In the present invention, the arrangement (recording) position of the phase adjustment pattern data Dφ is not particularly limited. As an example, as shown in FIG. 5, the phase adjustment pits P may be recorded in a vacant region between the synchronizing pit $P_{sync}$ arranged after wobble pits $P_{w1}$, $P_{w2}$ of respective sectors and the data region of the recording data $D_{REC}$. Alternatively, the phase adjustment pits P may be recorded in the data area.

[III] Reproduction (i) Reproducing system

Initially, the reproducing system will now be described with reference to FIG. 3. At the time of reproducing data recorded on the optical disk 1, reproducing signal $X_1$ is produced from the recording surface by means of an optical pickup (not shown). The reproducing signal $X_1$ thus obtained is amplified by a data reproducing circuit 5 to be a predetermined amplitude, and then undergoes a processing such as waveform shaping, etc. The processed signal thus obtained is fed to an A/D converter 6 and a clock extraction circuit 8 as reproduced data $X_2$. The A/D converter 6 conducts the A/D conversion to the reproduced data $X_2$ and supplies the digital data $X_3$ thus produced to a demodulator 7 and a phase detector 9. The demodulator 7 demodulates the inputted digital data $X_3$ and output demodulated data $X_4$ of recording data $D_{REC}$. In this case, if the phase of the reproduced data $X_2$ and the phase of a sampling clock signal $CLK_s$ serving as a reference clock of the A/D converter 6 are not in phase with each other, correct data sampling is not carried out, and data reproduction becomes inaccurate as previously described.

In order to overcome this problem, in this invention, there is provided a loop for adjusting a phase shift between the reproduced data $X_2$ and the sampling clock signal $CLK_s$ by referring to the phase adjustment pattern data Dφ recorded together with the recording data. Namely, on the basis of phase adjustment pattern data Dφ included in the digital data $X_3$ produced from the A/D converter 6, the phase detector 9 detects a phase shift between the reproduced data $X_2$ and the sampling clock signal $CLK_s$.

Although the detailed operation will be described later with reference to FIGS. 6 and 7, the outline thereof is as follows. The phase detector 9 judges, on the basis of the phase adjustment pattern data Dφ, whether the phase shift between the reproduced data $X_2$ and the sampling clock signal $CLK_s$ is increasing (diverging) or decreasing (converging), in which direction the phase shift is increasing and whether the phase shift is in a lead or lag state. Then, the phase detector 9 outputs a divergence flag $F_{div}$, a convergence flag $F_{conv}$, a divergence direction flag $F_{dir}$, a lead flag $F_f$ and a lag flag $F_d$ in correspondence with the above-mentioned judgment results. The divergence flag $F_{div}$, the convergence flag $F_{conv}$ and the divergence direction flag $F_{dir}$ are fed to the MPU 10, and the lead flag $F_f$ and the lag flag $F_d$ are fed to a phase adjustment circuit 11. The MPU 10 controls the phase adjustment circuit 11 on the basis of the divergence flag $F_{div}$, the convergence flag $F_{conv}$ and the divergence direction flag $F_{dir}$ which are inputted thereto. It is to be noted that the MPU 10 controls the entirety of the system including the operations of the demodulator 7 and the phase detector 9 in addition to the above-mentioned operation. The phase adjustment circuit 11 receives the lead flag $F_f$ and the lag flag $F_d$ to shifts the phase of the sampling clock signal $CLK_s$ in a necessary direction by a necessary quantity and feeds the adjusted sampling clock signal $CLK_s$ back to the A/D converter 6 so that the reproduced data $X_2$ and the sampling clock signal $CLK_s$ becomes in phase with each other. In this embodiment, the clock extraction circuit 8 extracts a reproducing pulse of synchronizing pits $P_{sync}$ formed in advance on the optical disk 1 and feeds it to the phase adjustment circuit 11 as an extracted clock signal $CLK_d$. This extracted clock signal $CLK_d$ serves as a reference clock for generating the sampling clock signal $CLK_s$.

Figure 6:
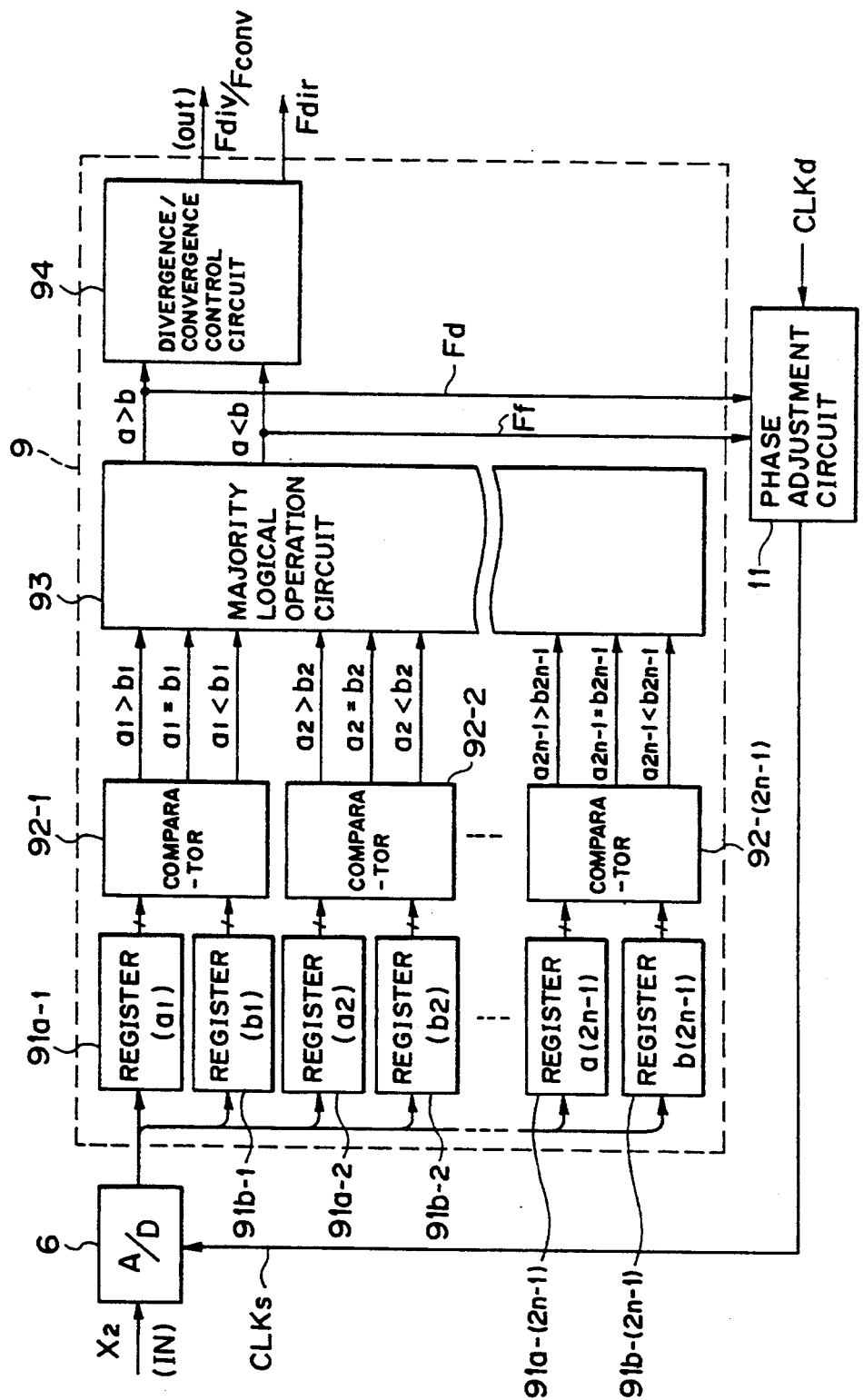
FIG. 6 is a block diagram of a phase detector shown in FIG. 3.

As shown in FIG. 6, the phase detector 9 has a configuration for processing data of a plurality of blocks #1, #2 ... #m of the phase adjustment pattern data Dφ. This circuit includes registers $91_{a-1} \sim 91_{a-(2n-1)}$, $91_{b-1} \sim 91_{b-(2n-1)}$ for temporarily and individually storing respective sample values (e.g., $a_{11} \sim a_{2n-1}$, $b_{11} \sim b_{(2n-1)}$) of the phase adjustment $p_{ij}$ within one block, comparators $92_{-1} \sim 92_{-(2n-1)}$ for comparing magnitude of sample values "a" and "b" of the respective phase adjustment pits P, a majority operation circuit 93 for taking a majority of compared results within one block, and a divergence/convergence judgment circuit 94 for judging, on the basis of a result ("a>b" or "a<b") of the majority operation, whether or not the phase shift is in a divergent state or a convergent state in order to output a divergence flag $F_{div}$ or a convergence flag $F_{conv}$ corresponding thereto.

Figure 8:
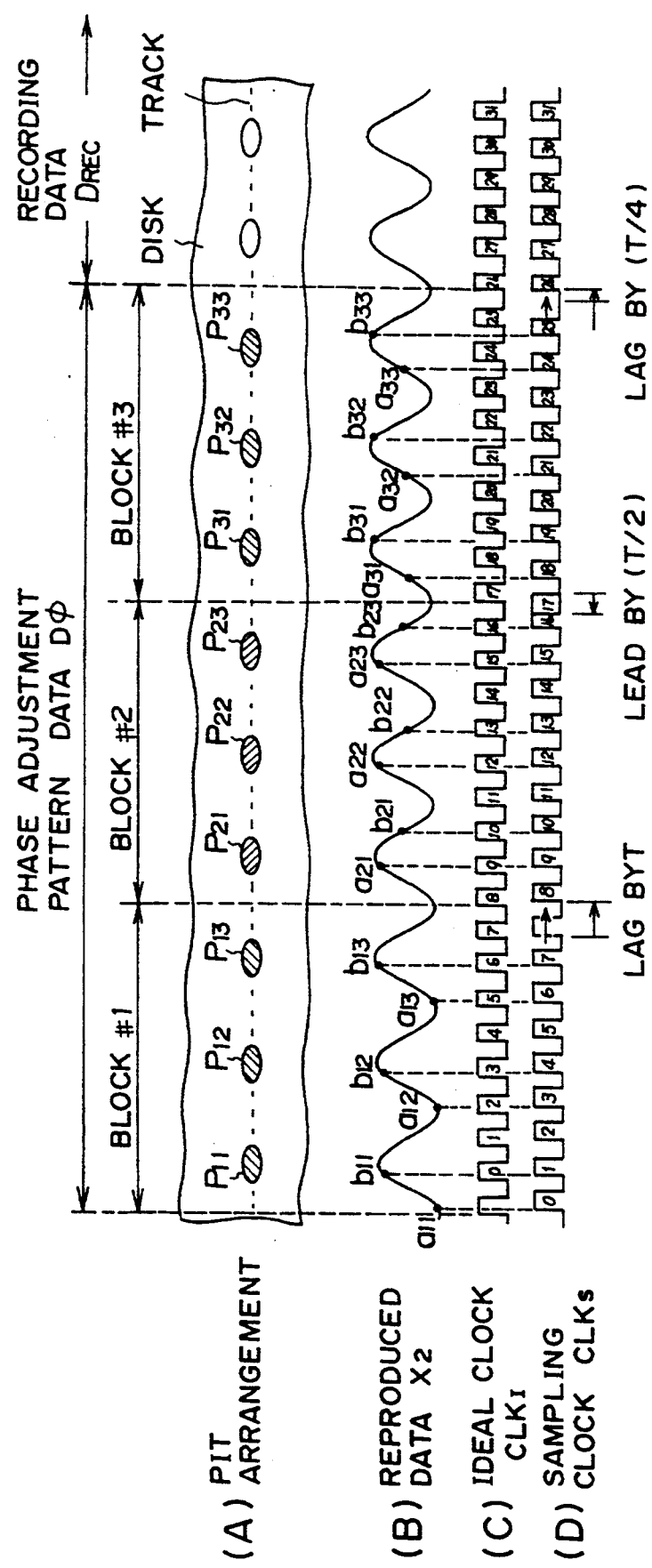
FIG. 8 is a timing chart of the phase adjustment operation.
Figure 9:
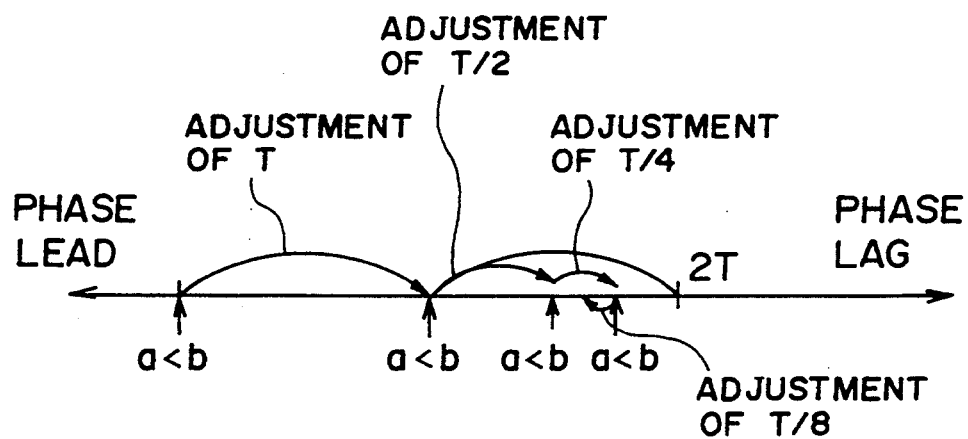
FIG. 9 is an explanatory view showing an example of a phase adjustment operation.

The phase adjustment circuit 11 includes a phase-shifting circuit using such as a delay elements and shifts the phase of the extracted clock signal $CLK_d$ in lead direction or lag direction in accordance with the lead flag $F_f$ or the lag flag $F_d$, and produces the sampling clock signal $CLK_s$. A quantity of phase shift is set to be successively varied stepwise as described later (see. FIGS. 8 and 9).

(ii) Algorithm of phase detection and phase adjustment

Figure 7:
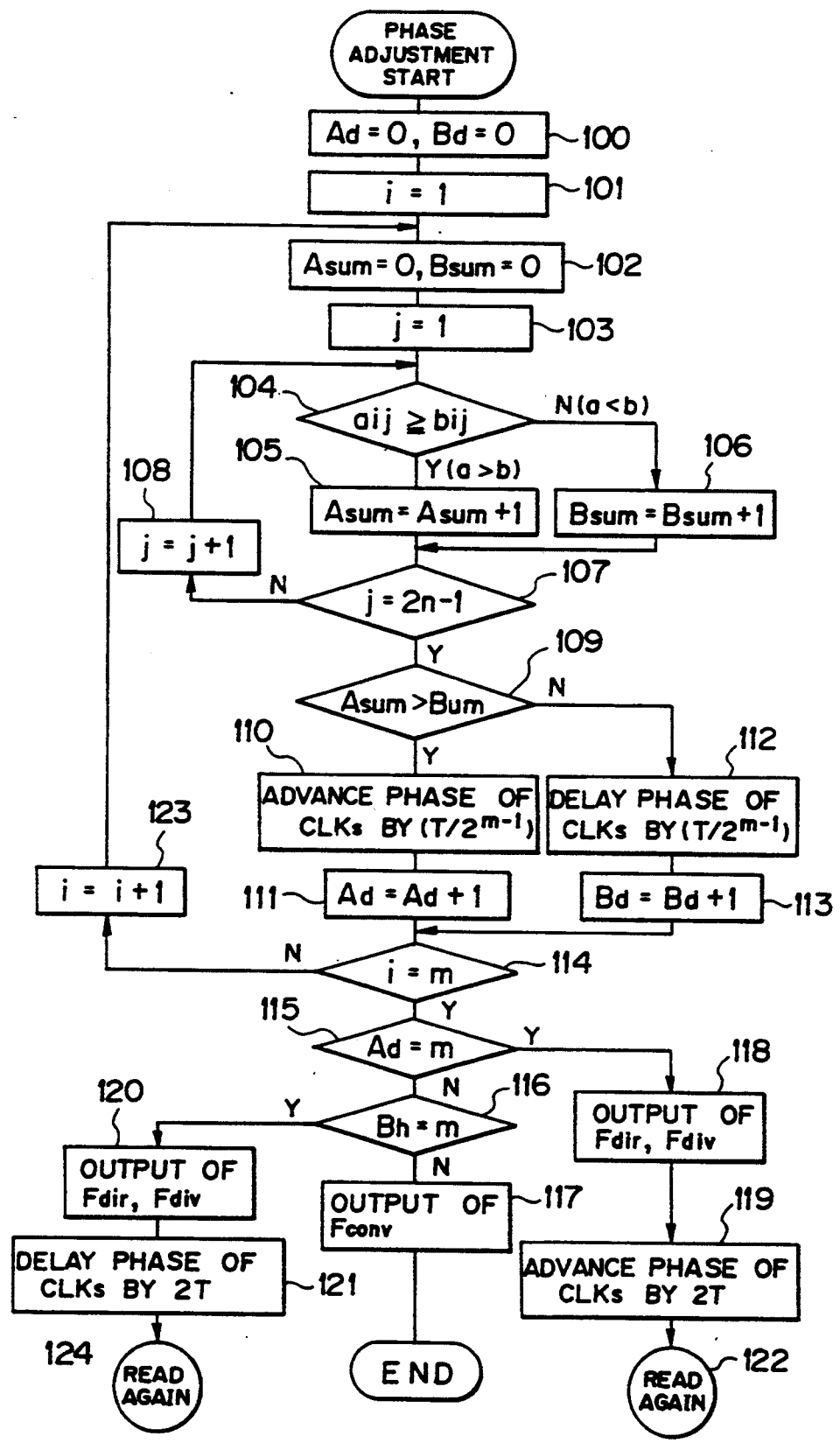
FIG. 7 is a flowchart showing an algorithm of phase detection and phase adjustment at the time of reproduction.

The algorithm of phase detection and phase adjustment at the time of reproduction is shown in FIG. 7. The timing chart of the adjustment operation is shown in FIG. 8. An example of the adjustment pattern of the phase shift is shown in FIG. 9.

Explanation will proceed with reference to FIG. 7. At the time of a reproduction, initialization of data at respective portions is carried out in steps 100–103. Namely, in step 100, the number $A_d$ of blocks in which phase-lag of the sampling clock signal $CLK_s$ is detected and the number $B_d$ of blocks in which phase-lead of the sampling clock signal $CLK_s$ is detected are reset to zero, respectively. In step 101, the block number i of the phase adjustment pattern data $D\phi$ is set to 1 (i.e. i=#1). In step 102, the count value $A_{sum}$ of phase lag detection counter and the count value $B_{sum}$ of phase lead detection counter for a block are reset to 0, respectively. In step 103, the pit number j for a block is set to 1. Namely, this step is a preparation step for starting sampling from the first phase adjustment pit $P_{11}$.

Then, data of sample values $a_{11}$, $b_{11} \sim a_{1(2n-1)}$, $b_{1(2n-1)}$, $b_{1(2n-1)}$ of respective phase adjustment pits $P_{11} \sim P_{1(2n-1)}$ within the block #1 are produced and the sample values $a_{1j}$ and $_{1j}b$ are compared with each other for every pits in the block #1 in step 104. If the comparison result in the step 104 is YES ($a_{1j} > b_{1j}$), the value of the phase lag detection counter $A_{sum}$ is incremented by +1 in step 105. On the other hand, if the comparison result is NO ($a_{1j} < b_{1j}$), the value of the phase lead detection counter $B_{sum}$ is incremented by +1 in step 106.

Then, it is judged whether or not the pit number j reaches the number of the final pit within the block #1, i.e., comparisons in magnitude between sampled values $a_{1j}$ and $b_{1j}$ for all pits $P_{1j}$ within the block #1 are completed or not, in step 107. These operation is executed with respect to the blocks #1 by repeating the steps 104, 105 (or 106), 107, 108 and 104.

Next, result values $A_{sum}$ and $B_{sum}$ calculated by the counter in steps 105 and 106 are compared with each other, i.e., majority operation is performed in step 109. If the result of the judgment in step 109 is YES ($A_{sum} > B_{sum}$), this indicates that the phase of the sampling clock signal $CLK_s$ lags with respect to the reproduced data $X_2$. Accordingly, the phase of the sampling clock signal $CLK_s$ is advanced by $T/2^{m-1}$ in step 110. On the other hand, if the result in step 109 is NO ($A_{sum} < B_{sum}$), this indicates that the phase of the sampling clock signal $CLK_s$ leads with respect to the reproduced data $X_2$. Accordingly, the phase of the sampling clock signal $CLK_s$ is delayed by $T/2^{m-1}$ in step 112.

The quantity of phase adjustment is set to $T/2^{m-1}$ in this example. This is because, to make a fine adjustment, the phase adjustment quantity is set to a large value at first and gradually varied to be smaller when the adjustment process of the blocks are proceeded. For example, as shown in FIG. 9, the phase of the sampling clock signal $CLK_s$ is shifted by T at the block #1 and shifted by T/2 at the subsequent block #2. In the same manner, the phase is shifted in succession by (T/4), (T/8) . . . .

After the phase adjustment in step 110 or 112 is completed, detected block numbers $A_d$ and $B_d$ are respectively incremented by +1 in steps 111 and 113.

The above processing is repeated until the phase adjustment processing for all (m number of) blocks is completed in steps 114 and 123. Then, it is judged whether the phase adjustment processing for all blocks is completed or not in step 114.

Subsequently, in order to confirm the effect of the phase adjustment, it is judged whether the phase shift is in a divergent state or in a convergent state in steps 115 and 116. Namely, in step 115, if the number $A_d$ of blocks in which phase lag is detected is equal to the number (m) of all blocks ($A_d=m$), it means that the phase shift between the sampling clock signal $CLK_s$ and the phase of $X_2$ is not converging but diverging to a phase-lag direction although the phase adjustment is made. Accordingly, the processing proceeds to step 118 in which the divergence flag $F_{div}$ and the divergence direction flag $F_{dir}$ are produced and supplied to the MPU 10, The MPU 10 feeds a control signal $C_3$ to the phase adjustment circuit 11 to advance the phase of the sampling clock signal $CLK_s$ by 2T in step 119. Then, the phase detection and the phase adjustment are executed again in step 122.

On the other hand, in step 116, if the number $B_d$ of blocks in which phase lead is detected is equal to the number (m) of all blocks ($B_d=m$), it means that the phase shift between the sampling clock signal $CLK_s$ and the phase of $X_2$ is not converging but diverging to a phase-lead direction although the phase adjustment is made. Accordingly, the processing proceeds to step 120 in which the divergence flag $F_{div}$ and the divergence direction flag $F_{dir}$ are produced and supplied to the MPU 10. The MPU 10 feeds a control signal $C_3$ to the phase adjustment circuit 11 to delay the phase of the sampling clock signal $CLK_s$ by 2T in step 121. Then, the phase detection and the phase adjustment are executed again in step 124.

If both the judgments in steps 115 and 116 result NO, i.e., $A_d \neq m$, $B_d \neq m$, it means that the phase shift is converging, and accordingly the convergence flag $F_{conv}$ is supplied to the MPU 10 to terminate the phase adjustment (END).

The above-mentioned operation is summarized as follows. In steps 100–103, initialization is carried out. In steps 104–108, the comparison judgment of sample values and summing of judged results of lead/lag of phase with respect to one block are carried out. In steps 109–112, phase adjustment of the sampling clock signal $CLK_s$ based on the comparison result is carried out. In steps 111 and 113, summing of Judged results of lead/-lag of phase is carried out for one blocks. In steps 114 and 123, the summing operation is carried out with respect to all (m) blocks. In steps 115 and 116, judgment of divergence/convergence of the phase adjustment is carried out. As a result, if the phase is in a divergent state, retrial (steps 118, 119, 122, 120, 121 and 124) is carried out. In contrast, if the phase is in a convergent state, the processing is terminated.

In the case where the phase shift is converged by the above-mentioned phase adjustment processing, the phase adjustment can be made with an accuracy expressed below:

$$\pm T/2^{m-1}$$

An example of the phase adjustment state is shown in FIG. 8. It is now assumed that phase adjustment pattern data $D\phi$ is recorded on the optical disk 1 as pits P arrangement as shown in FIG. 8 and its reproduced data $X_2$ is obtained as a sequence of solitary waves. At this time, an ideal clock signal $CLK_1$ in phase with the reproduced data $X_2$ takes timings as shown in FIG. 8. Now, it is assumed that a sampling clock signal $CLK_s$ actually obtained has a phase shift as shown. On such a premise, according to the previously described phase adjustment, the phase of the sampling clock $CLK_s$ is first delayed by T at the end of the block #1, advanced by T/2 at the end of the block #2, and then delayed by T/4 at the end of the third block #3. In this way, the sampling clock signal $CLK_S$ is adjusted to be in phase with the reproduced data $X_2$ before reading of the data area $D_{REC}$ starts. Therefore, when recorded data in the data area $D_{REC}$ is reproduced, the recorded data is read out by the correct sampling clock signal $CLK_S$ which is in phase with the reproduced data $X_2$. As a result, reproducing ability is improved and an error occurrence rate can be reduced.

Figure 11:
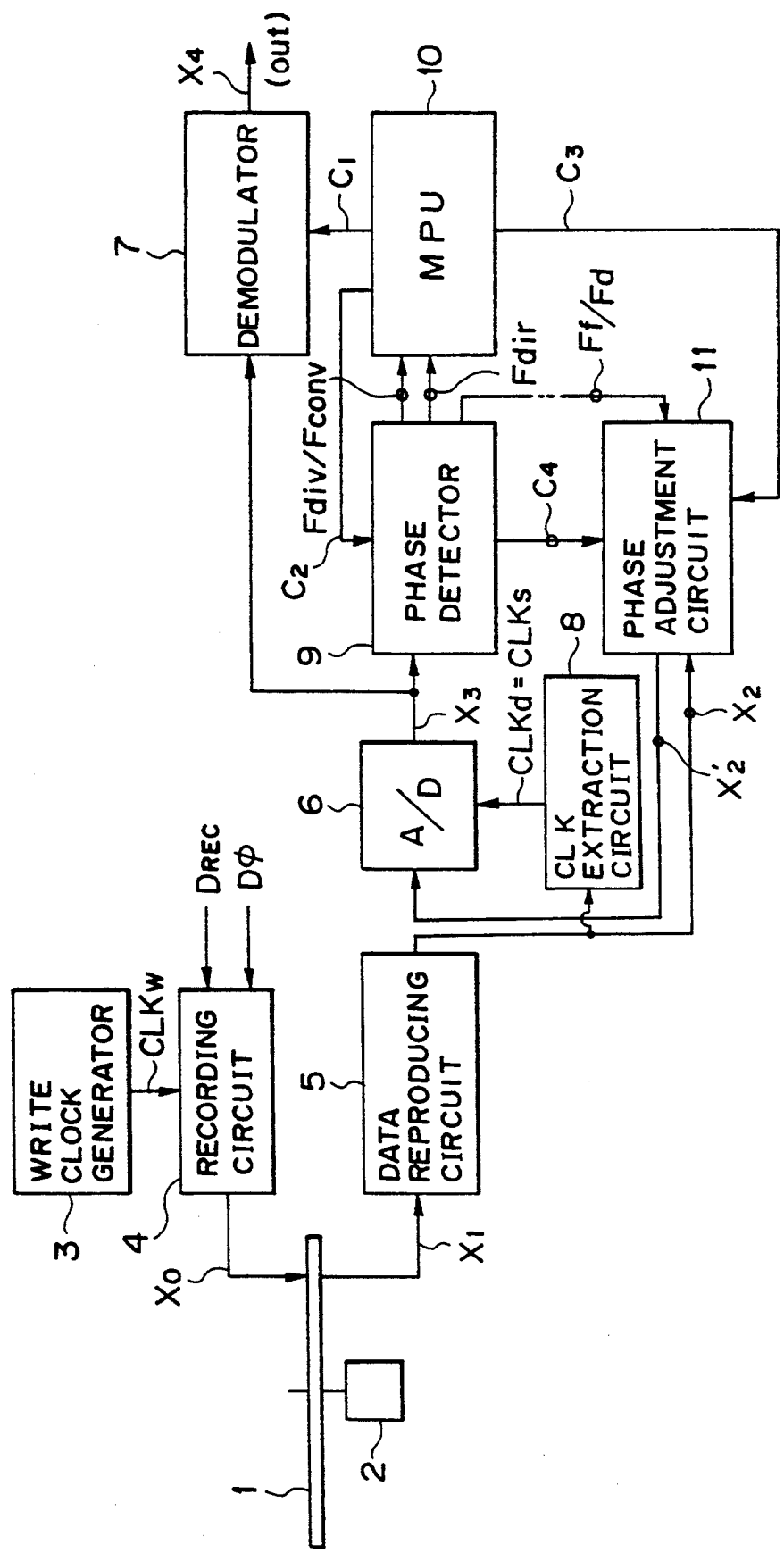
FIG. 11 is a block diagram showing another embodiment of the present invention.

While in the above description, the phase of the sampling clock signal $CLK_S$ is adjusted. However, since a phase shift between the reproduced data $X_2$ and the sampling clock signal $CLK_S$ is considered to be relative value, the phase of the reproduced data $X_2$ may be shifted. In that case, as shown in FIG. 11, the reproduced data $X_2$ outputted from data reproducing circuit 5 is supplied to the phase adjustment circuit 11 using an analog delay circuit, etc. so as to adjust the phase of the reproduced data $X_2$ to be in phase with the extracted clock signal $CLK_d$ by the phase adjustment circuit 11. In this case, the clock $CLK_d$ outputted from the clock extraction circuit 8 is supplied as a sampling clock signal $CLK_S$ to the A/D converter 6 with no phase adjustment.

It is to be noted that while it has been described that the number of pits P of respective blocks #1~#m in the phase adjustment pattern data $D\phi$ are the same, this invention is not limited to such a feature.

Figure 10:
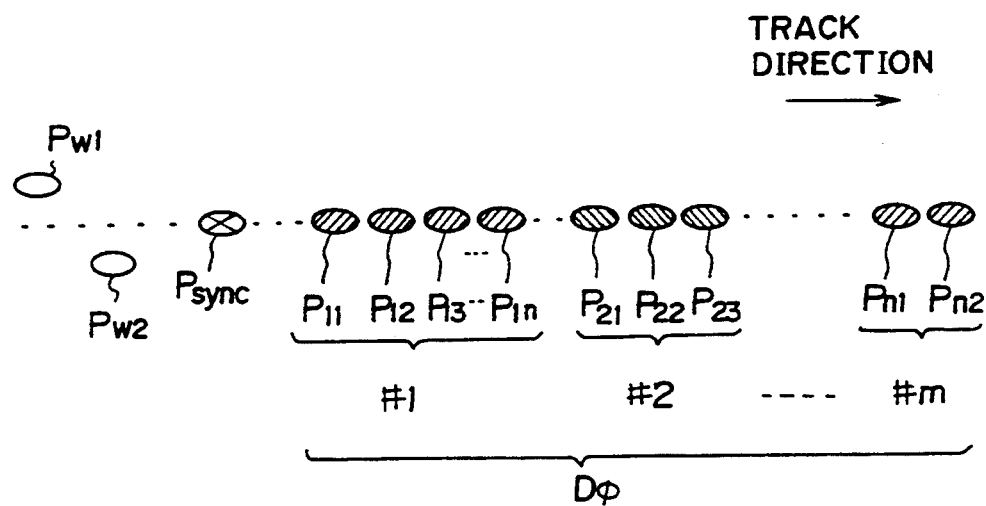
FIG. 10 is an explanatory view showing another example of the arrangement of phase adjustment pits.

Namely, as shown in FIG. 10, the number of pits P may be reduced in succession according to the number of blocks proceeds or increases. As previously described, phase adjustment is carried out by reducing in succession the phase shift width of T, T/2, T/4, T/8 ... to gradually converge the phase. In this case, in consideration of a defect, etc. on an optical disk, the number of pits is set to be large at blocks in which a larger phase adjustment is required (e.g., block #1 having the largest phase adjustment width). This may suppress the occurrence of the phase shift detection error. By employing such an approach, the maximum adjustment effect can be obtained by a minimum number of pits when the recording space of the phase adjustment pattern data $D\phi$ is limited.

Further, while it has been described that the recording medium is a write once type optical disk, this invention is not limited to this feature. For example, this invention is applicable to a recording medium such as a magneto-optical disk or a magnetic tape, etc.

In addition, while It has been described that a system of recording data as presence or absence of pit is used as the system of recording the phase adjustment pattern data, this invention is applicable to any system which records data by utilizing chemical change or magnetization direction.

As described above, according to the present invention, an approach is employed to record phase adjustment pattern data reproduced as a plurality of solitary waves onto a recording medium together with recording data, it is possible to provide a recording medium in which the phase shift between the read clock signal and reproduced data is correctly adjusted.

Further, according to the present invention, it is possible to adjust the phase shift on the reproducing unit side. In addition, even if there exists a phase shift based on unevenness (variations) of the recording characteristics of individual recording media or unevenness (variations) of the operation characteristics of respective reproducing units, recorded data can be correctly reproduced.

What is claimed is:

1. A method of recording data onto a recording medium comprising the steps of:
   recording data to be recorded onto a recording medium, and
   recording phase adjustment pattern data together with said data to be recorded, as a plurality of phase adjustment pits with intervals therebetween so that a reproducing signal of the phase adjustment pits is composed of a solitary wave.

2. A method according to claim 1, wherein said data to be recorded is recorded in a plurality of data blocks, and said phase adjustment pattern data is recorded in each of said data blocks.

3. A data recording disk having data recording tracks spirally formed, comprising:
   a plurality of data blocks successively formed on said recording tracks;
   first recording blocks formed in each of said data blocks on said recording tracks for recording data to be recorded; and
   second recording blocks formed in each of said data blocks for recording phase adjustment pattern data as a plurality of phase adjustment pits with intervals therebetween so that reproducing signal of the phase adjustment pits is composed of a solitary wave.

4. A data recording disk according to claim 3, wherein said second recording block comprises an odd number plurality of phase adjustment pits.

5. A data recording disk according to claim 3, wherein said recording disk comprises a write once type optical disk, and said data to be recorded is recorded as pits formed on said optical disk.

6. A method of reproducing data from a recording medium on which data including phase adjustment pattern data are recorded, said phase adjustment pattern data being recorded as a plurality of phase adjustment pits with intervals therebetween so that a reproducing signal of the phase adjustment pits is composed of a solitary wave said method comprising the steps of:
   reproducing said recorded data from said recording medium in synchronism with a read clock and producing a reproduced signal;
   extracting the phase adjustment pattern data of the solitary wave from said reproduced signal;
   detecting a phase shift between said reproduced signal and said read clock signal on the basis of the solitary wave; and
   adjusting phases of said read clock and said reproduced signal to be in phase with each other on the basis of said detected phase shift.

7. An apparatus for reproducing data from a recording medium on which data including phase adjustment pattern data are recorded, said phase adjustment pattern data being recorded as a plurality of phase adjustment pits with intervals therebetween so that a reproducing signal of the phase adjustment pits is composed of a solitary wave said apparatus comprising:
   means for reproducing said recorded data from said recording medium in synchronism with a read clock and producing a reproducing signal;
   means for extracting the phase adjustment pattern data of said solitary wave from said reproduced signal;

means for detecting a phase shift between the said reproduced signal and said read clock on the basis of said solitary wave; and means for adjusting phases of said read clock and said reproduced signal to be in phase with each other on the basis of said detected phase shift.

8. An apparatus according to claim 7, wherein said adjusting means shifts the phase of said read clock to be in phase with said reproduced signal.

9. An apparatus according to claim 7, wherein said adjusting means shifts the phase of said reproduced signal to be in phase with said read clock.

10. An apparatus according to claim 7, wherein said phase adjustment pattern data is recorded in a plurality of data blocks, and said phase detecting means comprises:

a plurality of comparison means for detecting a phase shift between the reproduced signal and the read clock for each of the plurality of data blocks and producing a plurality of block phase shift data; and majority operation means for detecting said phase shift by taking a majority of said block phase shift data.

11. An apparatus according to claim 7, wherein said recording medium comprises a write once type optical disk, and said data comprises pits formed on said optical disk.

* * * * *